United States Patent

[11] 3,563,573

[72] Inventors John L. F. Crompton
 Handforth, Cheshire, and
 Walter C. Peart-Davies, Knutsford,
 Cheshire, England
[21] Appl. No. 808,458
[22] Filed Mar. 19, 1969
[45] Patented Feb. 16, 1971
[73] Assignee The Dunlop Company Limited
 London, England
 a British company
[32] Priority Apr. 2, 1968
[33] Great Britain
[31] 15704/68

[54] PIPE ASSEMBLIES
 5 Claims, 13 Drawing Figs.
[52] U.S. Cl. .................................................. 285/55,
 285/368
[51] Int. Cl. ................................................... F16l 9/14
[50] Field of Search ........................................ 285/55,
 361, 351, 337, 342, 343, 423, 368, 414; 264/269

[56] References Cited
UNITED STATES PATENTS

| | | | |
|---|---|---|---|
| 2,201,862 | 5/1940 | Heisterkamp | 285/55 |
| 3,020,068 | 2/1962 | Costanzo | 285/55 |
| 3,047,937 | 8/1962 | Velchi | 285/55X |
| 3,207,534 | 9/1965 | Kimbrell et al. | 285/55 |
| 3,266,821 | 8/1966 | Safford | 285/55X |
| 3,403,206 | 9/1968 | Thomas et al. | 264/269X |
| 3,441,294 | 4/1969 | Krieg | 285/55 |

FOREIGN PATENTS

| 366,093 | 1/1932 | Great Britain | 285/368 |
|---|---|---|---|

Primary Examiner—Dave W. Arola
Attorney—Stevens, Davis, Miller & Mosher

ABSTRACT: A pipe assembly comprises two lengths of elastomer-linted pipe, particularly fibreglass-resin pipe, the lining of each length extending around the end to be coupled and folding back in a snug fit over the surface of the length, each length carrying a dished coupling member, the coupling members together providing a channel between them in which lies an annular sealing member, usually of elastomeric material, and pressing the sealing member against the folded-back portions of the lining.

PIPE ASSEMBLIES

This invention relates to pipe assemblies incorporating pipe lengths having elastomer linings, particularly pipe lengths comprising an outer shell of fiberglass-resin composition bonded to an elastomeric lining.

The present invention enables long lengths of pipe to be manufactured which may subsequently be cut to any individual length and then be coupled together.

The present invention provides a pipe assembly comprising two pipe lengths coupled together at adjacent ends, each length having an elastomer lining which extends around said adjacent end and folds back in a snug fit over the external surface of the length, and carrying a dished coupling member, the coupling members together providing a channel between them in which lies an annular sealing member, and the coupling members being held together so that the sealing member is pressed by the coupling members against the folded-back portions of the elastomer lining thereby providing a fluidtight seal between the two pipe lengths.

The word "pipe" as used in the this specification is to be understood to include any tubular member used, e.g. to convey fluid.

The present invention, also provides a kit of parts for the above assembly comprising a length of elastomer-lined pipe adapted to have the elastomer lining folded back around the end of the pipe length, a dished coupling member adapted to provide a channel between itself and another dished coupling member and an annular sealing member adapted to lie in the channel so as to lie against the folded back portion of the elastomer lining.

The folded-back portions of the elastomer linings are preferably bonded to the external surface of the pipe lengths. The invention is particularly suitable for connecting together lengths of pipe of the type comprising an elastomer lining bonded to an outer shell of fiberglass-resin composition for instance the pipe described in our British Pat. No. 1,116,572. With this type of pipe the fiberglass-resin outer shell may be cut back to expose the elastomer lining and the fiberglass-resin outer shells smoothed down at their cut ends, the elastomer linings folded back over the smoothed section and secured thereto with, for example, an adhesive. The dished coupling members may be of metal, fiberglass-resin composition, rigid plastics material or any other suitable material.

The sealing member preferably comprises an elastomer material and may be in more than one part, a two-component annular member being preferred. Where the sealing member is in one part it preferably has a substantially circular or substantially triangular cross section. When the cross section of the sealing member is substantially circular, the dished coupling members conveniently have their inner faces shaped so that the channel is in the form of a V-shaped groove, the linings of the two lengths are in contact with each other and the sealing member is wedged between the groove and the folded-back portions of the linings. The V angle of the groove is preferably about 90°. When the cross section of the sealing member is substantially triangular, the shape of the inner faces of the coupling members is conveniently such that the channel is in the form of a V-shaped groove which engages with two of the sides of the triangle, the other side of the triangle lying on the folded-back portions of the linings, the linings of the two lengths being in contact with each other. The V angle of the groove is preferably greater than 90°.

The sealing member may comprise two annular components one of which lies in the part of the channel provided by one of the coupling members while the other component lies in the part of the channel provided by the other coupling member, the two components being in sealing contact with each other. With this arrangement, the widths of the components may be such that the elastomer linings are held apart from each other by virtue of each of the components projecting from its coupling member, the projecting ends of the two components being in sealing contact with each other. This helps to ensure that the linings are not under compressive forces that might cause unwanted stresses to be set up in the linings. In one pipe assembly of this type, each component has a frustotriangular cross section and is cut away on its outer surface in the part projecting from its coupling member so that it is not urged outwardly between the two coupling members, and cut away on its inner surface in the part nearest the curved end portion of the respective elastomer linings so that no pressure is exerted on the curved or unsupported end portion.

In another example of a pipe assembly comprising a two-component sealing member, each component comprises a first annular element of substantially rectangular cross section and a second annular element of substantially U-shaped cross section in which the first element is housed, one of the legs of the second element having an integral flanged part substantially at right angles to it, the integral flanged part projecting from the respective coupling member and projecting outwardly between the two coupling members, the first element projecting from the respective coupling member, the integral flanged parts of the two second elements being in contact with each other and the projecting ends of the two first elements being in contact with each other, so that the lateral forces induced between the two first elements urge each of them into contact with the base and legs of its respective second element. This arrangement provides a multiplicity of sealing areas. Preferably the legs of the second element are of unequal length, the projecting end of the first element is convex, the shorter leg of the second element is adhesively secured to the folded-back portion of the respective elastomer lining, and the outwardly projecting integral flanged part of the second element sits on a recess provided in the adjacent face of its respective coupling member.

In a preferred embodiment, each component of a two-component sealing member has a cross section which is that of a triangle having a convex side, the convex side constituting the projecting end of the component. The convex sides of the two components are thus in contact with each other, producing deformation along those sides, thereby providing a fluidtight seal.

The invention is now further described with reference to the accompanying drawings, in which.

Figure 1:
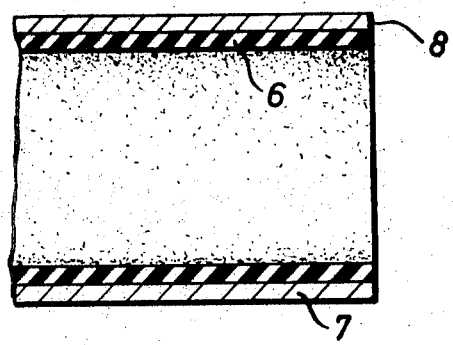
FIGS. 1, 2 and 3 are sections on the vertical diameter of two lengths of elastomer-lined fiberglass-resin pipe.
Figure 1:
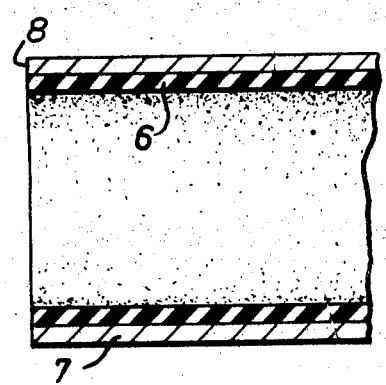
Figure 2:
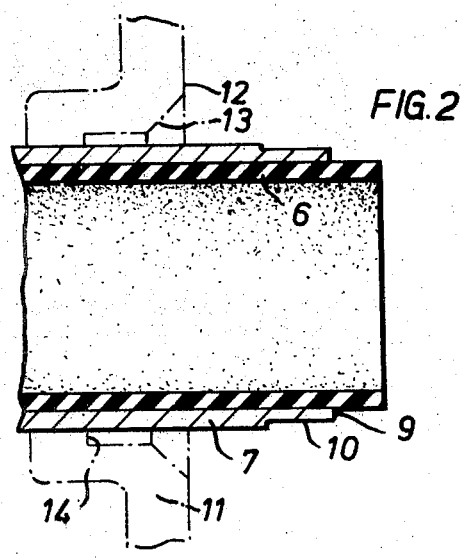
Figure 2:
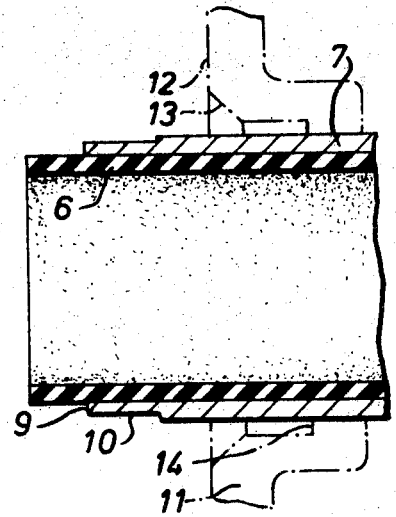

The fiberglass-resin outer shell 7 of the pipe lengths bonded to the elastomeric lining 6 is exposed at 8 on the ends of the pipe lengths (FIG. 1). To prepare the pipe lengths the outer shell is cut back approximately three-fourth inch to 9 (FIG. 2) so that the lining 6 is exposed. The end of the outer shell is smoothed down at 10 for a distance at least equal to the length of the exposed lining. The annular dished coupling members 11 moulded from fiberglass-polyester resin compound are slipped over the ends of the pipe lengths until required for the final operation. The dished coupling members are designed to have a flat face 12 terminating in an angled portion 13 at 45° to the flat face and a recess 14, the inner faces of the coupling members thereby providing a channel in the form of a V-shaped groove when the coupling members are held together.

Figure 3:
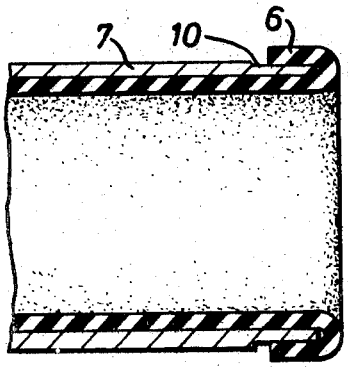
Figure 3:
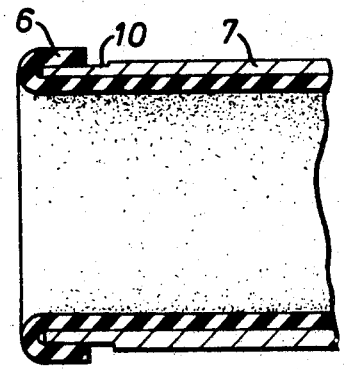

The elastomeric lining 6 is folded-back on top of the outer shell (FIG. 3) so that it rests on the smooth surface 10. The lining is adhesively secured to the cover in the area 10.

Figure 4:
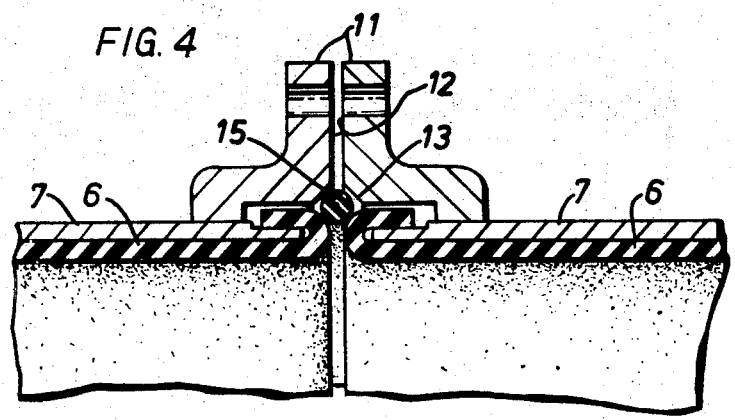
FIGS. 4 and 5 are sections on the vertical diameter of the two pipe lengths illustrating a pipe assembly according to one embodiment of the invention.

The coupling members are then moved into the position shown in FIG. 4 and are adhesively or mechanically secured to the fiberglass-resin outer shell.

In one embodiment of the invention an elastomeric sealing ring 15 is placed as shown in FIG. 4 and the coupling members are held together so as to just touch the ring 15. The sectional diameter of the sealing ring is such that the coupling members and the lining are approximately one-sixteenth inch apart, before the coupling members are bolted together to complete the seal, as illustrated in FIG. 4.

Figure 5:
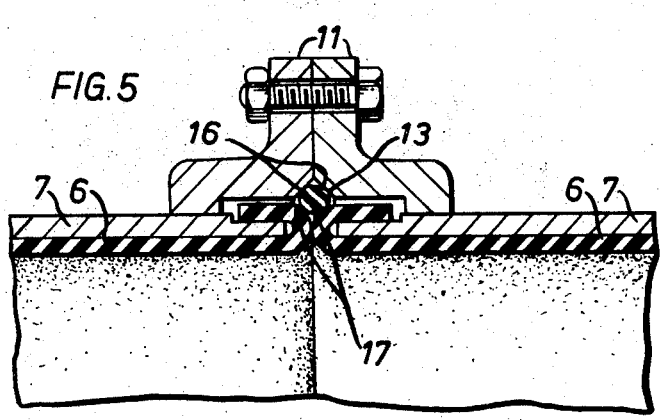

A view of the pipe assembly showing the coupling members in their closed position is given in FIG. 5. It will be seen that pressure is exerted on the elastomeric sealing ring 15 by the angled face 13 of the coupling member at points 16 which pushes the sealing ring into intimate contact with the lining 6 at points 17. Thus a complete seal is made which gives a leakproof joint.

The sealing ring 15 need not be restricted to one of circular cross section but could be of any cross section what would provide similar sealing arrangements to those described above.

Figure 6:
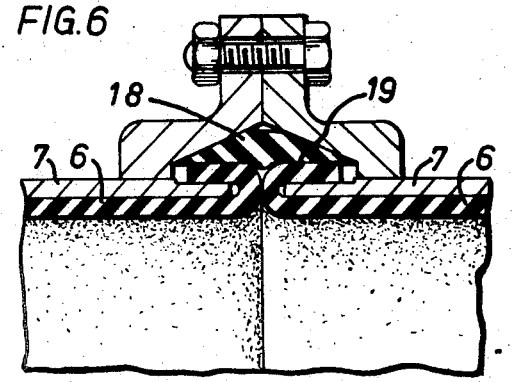
FIG. 6 is a section on the vertical diameter of the two pipe lengths illustrating a pipe assembly according to a second embodiment of the invention.

In a further embodiment (shown in FIG. 6) the angle of face 13 of the coupling member may be increased and a sealing member 18 of substantially triangular cross section may be used so that the sealing area is transferred from areas 17 of FIG. 5 to the flat surface 19 as shown in FIG. 6. In this case the pressure on the sealing member is in an area that is adjacent to the fiberglass-resin outer shell so that a more resilient sealing action is provided.

It will be seen that various modifications of the sealing member cross section and of the coupling member could be made to achieve the desired seal, and all would be easily assembled and provide a leakproof joint between two lengths of pipe joined together.

It will be appreciated that whilst the foregoing provides an easily assembled and leakproof pipe assembly, some difficulty may occur in breaking such an assembly due to the interference between the coupling members and the sealing member, when it is necessary to remove a section of long pipeline. This disadvantage can be overcome by using a sealing member in two parts and such embodiments are described below with reference to FIGS. 7—13 of the drawings.

Figure 7:
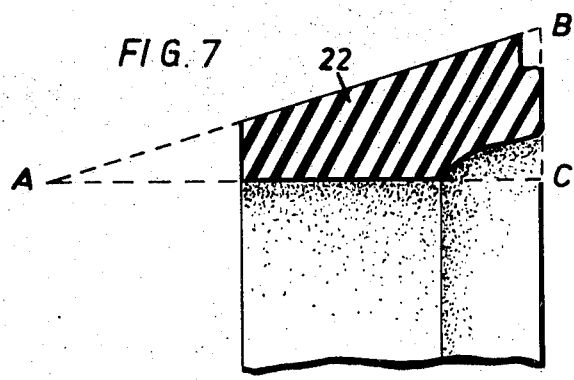
FIG. 7 is a sectional view of part of an annular elastomeric sealing member and FIG. 8 is a section on the vertical diameter of two pipe lengths illustrating a pipe assembly according to a third embodiment of the invention incorporating the sealing member of FIG. 7.

FIG. 7 shows one annular component 22 of a two component elastomeric sealing member. It is of frustotriangular cross section, i.e. it is basically of triangular cross section with apexes A, B, and C removed as shown by the dotted lines.

Figure 8:
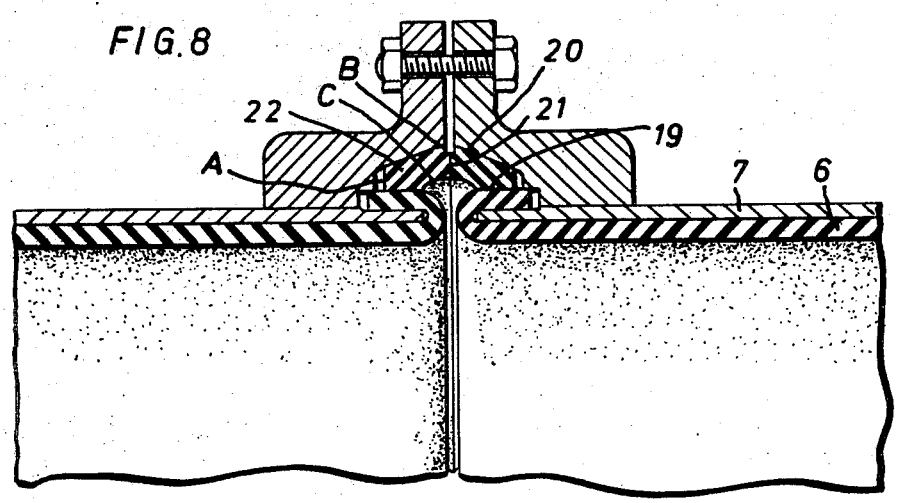

FIG. 8 is a view of a pipe assembly incorporating two of the annular components 22 with the coupling members in the closed position. In this assembly, the sealing member is designed so that there is a gap between the coupling members when the sealing condition is reached. Similarly there is a gap between the respective elastomer linings so that they are not under compressive forces that might cause unwanted stresses to be set up in the linings.

Some deformation of the sealing members will take place at A, B, and C. As far as A is concerned adequate clearance is provided so that there is no interference between face A and the coupling member. Each component of the sealing member is cut back at B so that it cannot be trapped between the coupling members, and is curved at C so that no pressure is exerted on the curved or unsupported section of the lining thus preventing any stressing of that section and also preventing the lining from being pushed into the bore or the pipe.

The pressure of the angled faces of the coupling members on faces 20 of the sealing member components 22 causes a seal to be made along the areas of contact at 19, 20 and 21.

Thus an assembly is provided that is easily assembled, is leakproof and can be easily dismantled.

Again it will be apparent that modifications of the coupling members and sealing member could be made to achieve the desired result.

Figure 9:
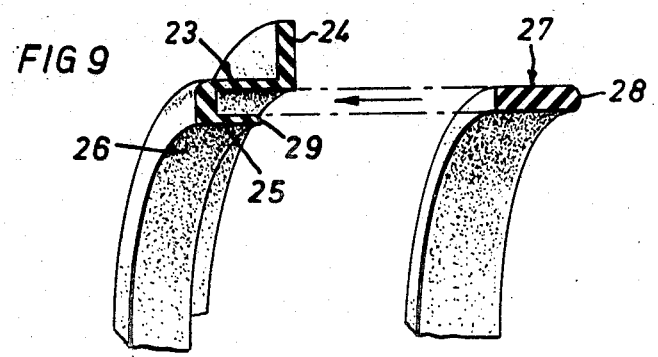
FIG. 9 is a sectional view of part of another annular sealing member and FIG. 10 is a section on the vertical diameter of two pipe lengths illustrating a pipe assembly according to a fourth embodiment of the invention incorporating the sealing member of FIG. 9.

In a further embodiment of the invention, each component of the elastomeric sealing member comprises an annular element of substantially rectangular cross section and an annular element of substantially U-shaped cross section in which the rectangular element is housed. For instance the elements may be as shown in FIG. 9, in which the annular element 27 has a rectangular cross section with one of the short sides curved at 28. The annular element 23 has a U-shaped cross section, the longer leg having an integral flanged part 24 at right angles to it and the shorter leg being curved at its extremity 29.

Figure 10:
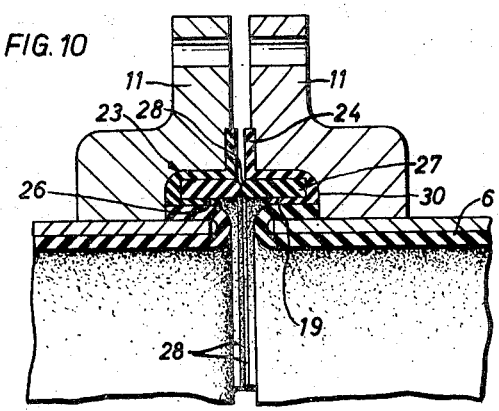

FIG. 10 is a sectional view of a pipe assembly incorporating this sealing member system, shown before the seal is completed by bolting up the coupling members. The curved surfaces 28 of the elements 27 are just touching in that condition.

With the coupling members 11 in the position shown in FIG. 10 an appropriate adhesive is applied to the surfaces 19 of the turned-back portions of the elastomeric lining, 6, and similarly to the short faces 26 of the U-shaped section.

The elements 23 are then pushed firmly into the annular channel between the linings 6 and the coupling members 11, so that there is intimate contact between the recessed faces of the coupling members 11 and the faces of the U-sections. The integral flanged parts sit on the respective recessed portions cut into the coupling members 11 and stand proud of the faces of the coupling members as shown in FIG. 10. The adhesive surfaces are pressed together to ensure a good bend is achieved.

The elements 27 are then pushed into the grooves of the U-sections and the curved ends 28 of the elements 27 project beyond the faces of the flanged parts 24.

The coupling members 11 are then brought together by bolting or otherwise, until the flanged parts 24 are in sealing contact face to face. The gap between the elastomeric linings although reduced by the inward movement of the coupling members 11 is still maintained so that the linings are not under any unnecessary stress.

With the coupling members in this closed position the elements 27 are sealed together in nose to nose relationship. Under the action of the induced lateral forces between the elements 27, the base of each element 27 is sealed against the base 30 of each U-section element. The lateral forces also cause the elements 27 to expand in a direction at right angles to the longitudinal axis, causing a sealing action to take place between the legs of the U-section, and the elements 27.

An assembly is thus produced with a multiplicity of sealing areas, and one that can be easily assembled and dismantled.

Figure 12:
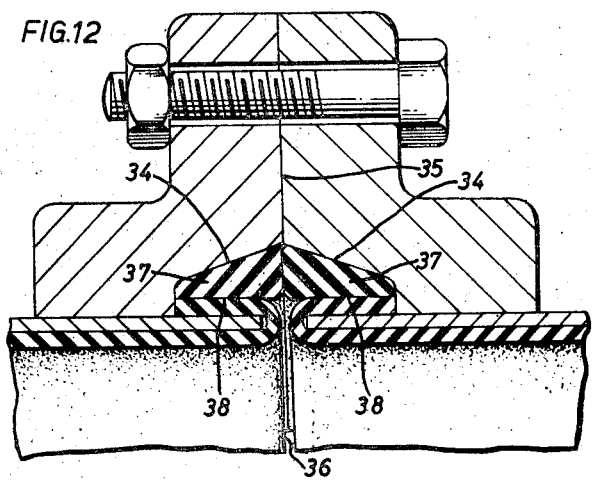
FIG. 11 illustrates the cross section of a further annular sealing member and FIG. 12 is a section on the vertical diameter of two pipe lengths illustrating a pipe assembly according to a fifth embodiment of the invention incorporating a sealing member having a cross section shown in FIG. 11.
Figure 11:
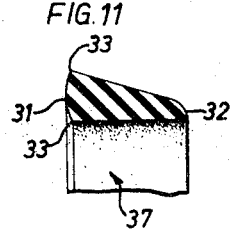

A preferred embodiment of the invention in which the assembly comprises a two-component sealing member is illustrated in FIGS. 11 and 12.

A cross-sectional view of one of the components of the annular elastomeric sealing member used in this embodiment is shown in FIG. 11; the cross section is basically a triangle with one curved side 31 and a curved apex 32 opposite that side.

A view of a pipe assembly incorporating a sealing member consisting of two of these components 37 is shown in FIGS. 12, with the coupling members in the closed position. When the sealing condition is attained there is a gap between the opposing elastomer linings so avoiding any stress or deformation of these.

The recesses 34 of the dished coupling members are shaped so as to accommodate both the folded-back portions of the elastomer linings and the components of the sealing member. The positions of the coupling members on the pipes are such that the flat faces 35 of the coupling members project slightly beyond the curved surfaces 36 of the folded-back linings. Thus when the two coupling members are brought into face to face contact the elastomer linings are separated by a small gap.

The major part of the sealing member is accommodated within the recesses 34 and is in close contact with the walls of the recesses and the elastomer linings. The curved surface 31 of each component of the sealing member is not encompassed by the respective recess; it projects beyond the flap face 35 of the coupling member so that the points 33 (shown in FIG. 11) defining the limits of the curve are approximately aligned with the flat face of the coupling member.

It will be apparent that when the two coupling members are brought together, deformation of the sealing member occurs only at the curved surfaces 31 of the two components. This deformation results in the production of a fluidtight seal between these surfaces. The components of the sealing member are also forced into the recesses 34 and further sealing contacts are established between the sealing members, the folded-back portions 38 of the elastomer linings and the recess walls.

Figure 13:
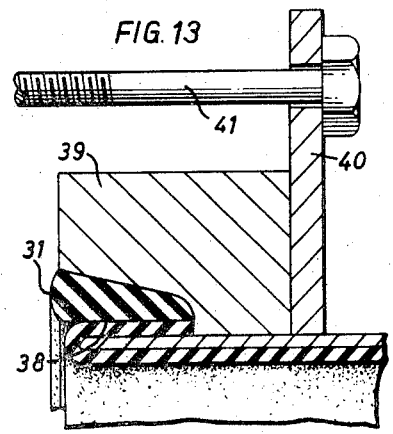
FIG. 13 is a sectional view of part of a dished coupling member in use.

Although the dished coupling members used in the different embodiments of the invention have been illustrated as full face flanges, the invention is not limited to the use of this type of coupling member. For instance stub flanges 39 having steel backing plates 40 and tie bolts 41 may be employed in the pipe assembly of this invention. The use of such a coupling member in the last-described embodiment of the invention is illustrated in FIG. 13.

We claim:

1. A pipe assembly comprising two lengths of pipe, said pipe comprising an outer shell and an elastomer lining bonded to said shell, said lengths having adjacent ends and being coupled together at said adjacent ends, each of said lengths having an elastomer lining which extends around said adjacent end and folds back in a snug fit over said outer shell, and carrying a dished coupling member, the two coupling members together providing a channel between them, an annular sealing member lying in said channel, said coupling members being held together and pressing said sealing member in fluidtight sealing relationship against the folded-back portions of said elastomer linings, said sealing member being of substantially circular cross section, the shape of the inner faces of said coupling member providing said channel with the form of a V-shaped groove, said linings being in contact with each other, and said sealing member being wedged between said groove and said folded-back portions.

2. A pipe assembly comprising two lengths of pipe, said pipe comprising an outer shed shell and an elastomer lining bonded to said shell, said lengths having adjacent ends and being coupled together at said adjacent ends, each of said lengths having an elastomer lining which extends around said adjacent end and folds back in a snug fit over said outer shell, and carrying a dished coupling member, the two coupling members together providing a channel between them, an annular sealing member lying in said channel, said coupling members being held together and pressing said sealing member in fluidtight sealing relationship against the folded-back portions of said elastomer linings, said sealing member being of substantially triangular cross section, the shape of the inner faces of said coupling members providing said channel with the form of a V-shaped groove which engages with two of the sides of said triangle, the other side of said triangle lying on said folded-back portions of said linings, said linings being in contact with each other.

3. A pipe assembly comprising two lengths of pipe, said pipe comprising an outer shell and an elastomer lining bonded to said shell, said lengths having adjacent ends and being coupled together at said adjacent ends, each of said lengths having an elastomer lining which extends around said adjacent end and folds back in a snug fit over said outer shell, and carrying a dished coupling member, the two coupling members together providing a channel between them, an annular sealing member lying in said channel, said coupling members being held together and pressing said sealing member in fluidtight sealing relationship against the folded-back portions of said elastomer linings, said sealing member comprising two annular components, one of said components lying in the part of said channel provided by one of said coupling members, the other of said components lying in the part of said channel provided by the other of said coupling members, said components holding said elastomer linings apart from each other by virtue of each of said components having an end projecting from its coupling member, said projecting ends being in sealing contact with each other, said components having a frustotriangular cross section which is cut away on its outer surface at said projecting end so that it is not urged outwardly between said coupling members and cut away on its inner surface in the part thereof nearest the curved end portion of the respective lining so that no pressure is exerted on said curved end portion.

4. A pipe assembly comprising two lengths of pipe, said pipe comprising an outer shell and an elastomer lining bonded to said shell, said lengths having adjacent ends and being coupled together at said adjacent ends, each of said lengths having an elastomer lining which extends around said adjacent end and folds back in a snug fit over said outer shell, and carrying a dished coupling member, the two coupling members together providing a channel between them, an annular sealing member lying in said channel, said coupling members being held together and pressing said sealing member in fluidtight sealing relationship against the folded-back portions of said elastomer linings, said sealing member comprising two annular components, one of said components lying in the part of said channel provided by one of said coupling members, the other of said components lying in the part of said channel provided by the other of said coupling member, said components holding said elastomer linings apart from each other by virtue of each of said components having an end projecting from its coupling member, said projecting ends being in sealing contact with each other, each of said components comprising a first annular element of substantially rectangular cross section and a second element of substantially U-shaped cross section said U-shaped cross section comprising two legs and a base joining said legs, in which said first element is housed, one of said legs having an integral flanged part substantially at right angles to it, said integral flanged part projecting from the respective coupling member and outwardly between the two said coupling members said first element having an end projecting from the respective coupling member, the two integral flanged parts being in contact with each other and the two projecting ends being in contact with each other inducing lateral forces between said first elements and pushing each of them into contact with said base and said legs of the respective second element.

5. A pipe assembly comprising two lengths of pipe, said pipe comprising an outer shell and an elastomer lining bonded to said shell, said lengths having adjacent ends and being coupled together at said adjacent ends, each of said lengths having an elastomer lining which extends around the adjacent end and folds back in a snug fit over said outer shell, and carrying a dished coupling member, the two coupling members together providing a channel between them, and an annular sealing member lying in said channel, said sealing member comprising two annular components lying respectively in the coupling members, each of the components having a convex surface which in the undeformed condition projects from the respective coupling member, the respective coupling member having a mating face substantially aligned with the inner and outer limits of the said convex surface, the mating faces of the coupling members being held together whereby the convex surfaces of said annular components are deformed and pressed into fluidtight sealing contact with each other and said annular components are pressed into fluidtight sealing contact, with the folded-back portion of the respective elastomer lining.